US005563261A

United States Patent [19]

Keoshkerian et al.

[11] Patent Number: 5,563,261

[45] **Date of Patent: * Oct. 8, 1996**

[54] HYDROXYGALLIUM PHTHALOCYANINE PHOTOCONDUCTIVE IMAGING MEMBERS

[75] Inventors: Barkev Keoshkerian, Thornhill; George Liebermann; Cheng-Kuo Hsiao, both of Mississauga; James D. Mayo, Toronto; Dasarao Murti, Mississauga; Sandra J. Gardner, Willowdale, all of Canada

[73] Assignee: Xerox Corporation, Stamford, Conn.

[ * ] Notice: The term of this patent shall not extend beyond the expiration date of Pat. No. 5,473,064.

[21] Appl. No.: 469,240

[22] Filed: Jun. 6, 1995

Related U.S. Application Data

[62] Division of Ser. No. 332,304, Oct. 31, 1994, Pat. No. 5,482,811.

[51] Int. Cl.[6] .................................................. C09B 67/12

[52] U.S. Cl. ......................... 540/141; 540/139; 540/142; 540/140

[58] Field of Search .................................. 540/139, 140, 540/141

[56] References Cited

U.S. PATENT DOCUMENTS

| | | | |
|---|---|---|---|
| 5,350,844 | 9/1994 | Martin et al. | 540/140 |
| 5,360,475 | 11/1994 | Nukada et al. | 540/139 |

FOREIGN PATENT DOCUMENTS

| | | |
|---|---|---|
| 6-73299 | 3/1994 | Japan . |

*Primary Examiner*—Mukund J. Shah
*Assistant Examiner*—Pavanaram Sripada
*Attorney, Agent, or Firm*—E. O. Palazzo

[57] ABSTRACT

A process for the preparation of hydroxygallium phthalocyanines which comprises hydrolyzing a gallium phthalocyanine precursor pigment by dissolving said hydroxygallium phthalocyanine in a strong acid and then reprecipitating the resulting dissolved pigment in basic aqueous media; removing any ionic species formed by washing with water, concentrating the resulting aqueous slurry comprised of water and hydroxygallium phthalocyanine to a wet cake; removing water from said slurry by azeotropic distillation with an organic solvent, and subjecting said resulting pigment slurry to mixing with the addition of a second solvent to cause the formation of said hydroxygallium phthalocyanine polymorphs.

31 Claims, No Drawings

HYDROXYGALLIUM PHTHALOCYANINE PHOTOCONDUCTIVE IMAGING MEMBERS

This is a division of application Ser. No. 332,304, filed Oct. 31, 1994, now U.S. Pat. No. 5,482,811.

BACKGROUND OF THE INVENTION

This invention is generally directed to hydroxygallium phthalocyanines and photoconductive imaging members thereof, and, more specifically, the present invention is directed to processes for the preparation of hydroxygallium phthalocyanines wherein in embodiments there is avoided the use of a halo, especially a chloro component, such as chlorogallium phthalocyanine and wherein water is azeotropically removed from the hydroxygallium phthalocyanine by, for example, stirring and heating in a hydrophobic solvent such as aliphatic solvents like hexane, heptane, cyclohexane, cyclopentane, esters such as propylacetate, butylacetate or ketones such as methyl isobutyl ketone, methyl isoamyl ketone, or toluene. Also, in embodiments the obtained hydroxygallium phthalocyanine is washed with an organic solvent/ammonia mixture to reduce the sulfur impurities, for example from about 3,000 parts per million to about 100 parts per million, and thereby improve the cyclic stability of the resulting photoconductive imaging member containing the washed phthalocyanine. In embodiments, the process of the present invention comprises the preparation of Type V hydroxygallium phthalocyanine which optionally comprises the formation of a precursor gallium phthalocyanine with, for example, an X-ray powder diffraction trace having peaks at Bragg angles of 7.6, 8.1, 9.7, 16.0, 18.4, 19.2, 19.9, 24.7, 25.7 and 26.2, and the highest peak at 8.1 degrees 2Θ, prepared by the reaction of 1,3-diiminoisoindolene with gallium acetylacetonate in a suitable solvent, such as N-methylpyrrolidone, or halonaphthalene like 1-chloronaphthalene, quinoline, and the like; hydrolyzing the precursor by dissolving in a strong acid and then reprecipitating the resulting dissolved pigment in aqueous ammonia, thereby forming Type I hydroxygallium phthalocyanine; and admixing the Type I formed with a hydrophobic solvent of, for example, hexanes, including 1-hexanes and/or isomers thereof, heptane, cyclohexane, cyclopentane or esters, such as propylacetate, butylacetate, or ketones such as methyl isobutyl ketone, methyl isoamyl ketone, or toluene, and thereafter azeotropically removing water therefrom. More specifically, in embodiments the process of the present invention comprises the formation of a precursor prepared by the reaction of 1 part gallium acetylacetonate with from about 1 part to about 10 parts and preferably about 4 parts 1,3-diimiinoisoindolene in a solvent, such as quinoline, chloronaphthalene, or N-methylpyrrolidone, in an amount of from about 10 parts to about 100 parts and preferably about 19 parts, for each part of gallium acetylacetonate that is used, to provide a pigment precursor gallium phthalocyanine, which is subsequently washed with a component, such as dimethylformamide to provide the precursor gallium phthalocyanine as determined by X-ray powder diffraction, with an X-ray powder diffraction trace having peaks at Bragg angles of 7.6, 8.1, 9.7, 16.0, 18.4, 19.2, 19.9, 24.7, 25.7, and 26.2, and the highest peak at 8.1 degrees 2Θ; dissolving 1 weight part of the resulting gallium phthalocyanine in concentrated, about 94 percent, sulfuric acid, in an amount of from about 1 weight part to about 100 weight parts and in an embodiment about 5 weight parts, by stirring the pigment precursor gallium phthalocyanine in the acid for an effective period of time, from about 30 seconds to about 24 hours, and in an embodiment about 2 hours at a temperature of from about 0° C. to about 75° C., and preferably about 40° C., in air or under an inert atmosphere, such as argon or nitrogen; adding the resulting mixture to a stirred organic solvent in a dropwise manner at a rate of about 0.5 milliliter per minute to about 10 milliliters per minute and in an embodiment about 1 milliliter per minute to a nonsolvent, which can be a mixture comprised of from about 1 volume part to about 10 volume parts and preferably about 4 volume parts of concentrated aqueous ammonia solution (14.8N) and from about 1 volume part to about 10 volume parts, and preferably about 7 volume parts of water, for each volume part of acid like sulfuric acid that was used, which solvent mixture was chilled to a temperature of from about −25° C. to about 10° C. and in an embodiment about −5° C. while being stirred at a rate sufficient to create a vortex extending to the bottom of the flask containing the solvent mixture; isolating the resulting blue pigmen t by, for example, filtration; and washing the hydroxygallium phthalocyanine product obtained with deionized water by redispersing and filtering from portions of deionized water, which portions are from about 10 volume parts to about 400 volume parts and in an embodiment about 200 volume parts for each weight part of precursor pigment gallium phthalocyanine which was used. The product, a dark blue solid, was confirmed to be Type I hydroxygallium phthalocyanine on the basis of its X-ray diffraction pattern having major peaks at 6.9, 13.1, 16.4, 21.0, 26.4, and the highest peak at 6.9 degrees 2Θ. The Type I hydroxygallium phthalocyanine product obtained as a wet cake, approximately 10 percent by weight pigment and 90 percent by weight water, can then be dried by azeotropically distilling off water with a hydrophobic solvent, such as hexane, of from 1 part to 30 parts of wet cake to 100 parts by volume of solvent, preferably 20 parts. Water is removed by heating to the azeotrope boiling point and continued until the distillate temperature reaches the boiling point of the hydrophobic solvent. The advantages of this method are, for example, that drying of the pigment consumes from 1 to 5 hours versus, for example, greater than 24 hours under vacuum by conventional means. Furthermore, the particle size remains in the range of 150 to 300 nanometers, as measured by TEM. Also, in embodiments the obtained crude hydroxy gallium phthalocyanine can be washed to reduce the sulfur content. The sulfur reduction washes can be accomplished on either the Type I hyrdoxygallium phthalocyanine or on the Type V hydroxy gallium phthalocyanine product. In the situation with sulfur reduction of the Type I hydroxygallium phthalocyanine, 1 part pigment to 10 parts pigment, preferably 5 parts pigment is redispersed in a hydrophilic solvent of, for example, N-methylpyrrolidone, tetrahydrofuran, acetone, methanol, isopropanol and N-N-dimethylformamide, from 100 parts solvent to 1,000 parts solvent, and preferably 300 parts. Subsequently, concentrated ammonium hydroxide (38 percent $NH_4OH$) solution is added, from 50 parts to 600 parts, and preferably 100 parts. The resulting dispersion is stirred for from 1 minute to 24 hours, and preferably 2 hours, and then filtered through a ceramic Buchner funnel using GFF/F filter paper. The organic solvent/aqueous base washing step is repeated 1 to 4 times, and preferably 1, and then the Type I hydroxygallium phthalocyanine is washed with deionized water until the filtrate conductivity is below from 0.1 to 20 milliSiemens per centimeter squared. The wet Type I hydroxygailium phthalocyanine pigment can than be dried azeotropically and then converted to Type V hydrogallium phthalocyanine by stirring in N-N-dimethylformamide 1 part Type pigment to 15 parts solvent.

The sulfur reduction can also be accomplished after conversion to the Type V hydroxy gallium phthalocyanine by filtering the N-N-dimethylformamide solution, redispersing the Type V hydroxygallium phthalocyanine, from 1 part to 10 parts, and preferably 5 parts in a hydrophilic solvent, such as N-N-dimethylformamide, from 100 parts solvent to 1,000 parts solvent, and preferably 300 parts. Thereafter, concentrated ammonium hydroxide solution is added, from 50 parts to 600 parts, preferably 100 parts. The resulting dispersion is stirred for from 1 minute to 24 hours, and preferably 2 hours, and then filtered. The organic solvent/aqueous base washing step is repeated from 1 to 4 times, and preferably 1 time, and then the Type V hydroxygallium phthalocyanine is washed with deionized water, to remove any ionic components, until the filtrate conductivity is from about 0.1 to about 20 milliSiemens per centimeter squared. The aqueous dispersion comprised of Type V hydroxygallium phthalocyanine, 5 parts, and 300 parts of water are filtered and then the Type V pigment is dried to provide Type V hydroxy gallium phthalocyanine. One advantage of low sulfur is reflected in superior performance of a resulting photoreceptor device. Better cycling stability of from 5 to 30 volts in 100,000 cycles is achieved and longer bench life for P/R devices results when Type V hydroxy gallium phthalocyanine with sulfur content from 25 to 200 ppm is used. The sulfur content in the product obtained was measured using a LECO SC 132 sulfur determinator. The sulfur can be burned in a furnace and detected by an infrared cell.

Advantages of the present invention in embodiments thereof include the use of an air stable reagent, gallium acetylacetonate, used in the reaction, in place of the highly reactive component gallium chloride, and the generation of a pigment precursor gallium phthalocyanine with an X-ray powder diffraction trace having peaks at Bragg angles of 7.6, 8.1,9.7, 16.0, 18.4, 19.2, 19.9, 24.7, 25.7, and 26.2, and the highest peak at 8.1 degrees 2Θ, which when converted to the product hydroxygallium phthalocyanine Type V, by the processes described in Examples VI and VII, is free of chlorine, as opposed to the process described in Example V, whereby there is generated a pigment precursor chlorogallium phthalocyanine with an X-ray powder diffraction trace having peaks at Bragg angles of 9.1, 11.0, 18.8, 20.3, and 27.0, and the highest peak at 27.0 degrees 2Θ, which, when converted to product hydroxygallium phthalocyanine Type V, by the processes described in Examples VI and VII, has residual chlorine levels of, for example, 0.68 percent. It is believed that impurities, such as chlorine, in the photogenerating Type V hydroxygallium phthalocyanine can cause a reduction in the xerographic performance thereof, and in particular, increased levels of dark decay, and such impurities have a negative adverse impact on the cycling performance of the photoreceptor device. Further, in embodiments there can be selected as a reactant an alkoxy gallium phthalocyanine dimer, reference copending patent application U.S. Ser. No. 233,834, U.S. Pat. No. 5,466,796 and U.S. Pat. No. 5,456,998.

The Type V obtained can be selected as organic photogenerator pigments in layered photoresponsive imaging members with charge transport layers, especially hole transport layers containing hole transport molecules such as known tertiary aryl amines. The aforementioned photoresponsive, or photoconductive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible using toner compositions of appropriate charge polarity. In general, the imaging members are sensitive in the wavelength region of from about 550 to about 900 nanometers, and in particular, from 700 to about 850 nanometers, thus diode lasers can be selected as the light source.

In *Bull. Soc. Chim. Fr.,* 23 (1962), there is illustrated the preparation of hydroxygallium phthalocyanine via the precursor chlorogallium phthalocyanine. The precursor chlorogallium phthalocyanine is prepared by reaction of o-cyanobenzamide with gallium chloride in the absence of solvent. O-cyanobenzamide is heated to its melting point (172° C.), and to it is added gallium chloride at which time the temperature is increased to 210° C. for 15 minutes, and then cooled. The solid is recrystallized out of boiling chloronaphthalene, to give purple crystals having carbon, hydrogen and chlorine analyses matching theoretical values for chlorogallium phthalocyanine. Dissolution in concentrated sulfuric acid, followed by reprecipitation in diluted aqueous ammonia, affords material having carbon, and hydrogen analyses matching theoretical values for hydroxygallium phthalocyanine.

In JPLO.221459, there are illustrated gallium phthalocyanine compounds which show the following intense diffraction peaks at Bragg Angles (2 theta +/−0.2°) in the X-ray diffraction spectrum, 1- 6.7, 15.2, 20.5, 27.0

2- 6.7, 13.7, 16.3, 20.9, 26.3 (hydroxygallium phthalocyanine Type I)

3- 7.5, 9.5, 11.0, 13.5, 19.1, 20.3, 21.8, 25.8, 27.1, 33.0 (chlorogallium phthalocyanine Type I).

Further, there is illustrated in JPLO.221459 a photoreceptor for use in electrophotography comprising a charge generation material and charge transport material on a conductive substrate, and the charge generation material comprising one or a mixture of two or more of gallium phthalocyanine compounds which show the following intense diffraction peaks at Bragg angles (2 theta +/−0.2°) in the X-ray diffraction spectrum, 1- 6.7, 15.2, 20.5, 27.0

2- 6.7, 13.7, 16.3, 20.9, 26.3

3- 7.5,9.5, 11.0, 13.5, 19. 1,20. 3,21. 8,25. 8,27. 1,33.0.

In Konica Japanese 64-17066/89, there is disclosed, for example, the use of a new crystal modification of titanyl phthalocyanine (TiOPc) prepared from alpha-type TiOPc (Type II) by milling it in a sand mill with salt and polyethylene glycol. This publication also discloses that this new polymorph differs from alpha-type pigment in its light absorption and shows a maximum absorbance at 817 nanometers while the alpha-type exhibits a maximum at 830 nanometers. The Konica publication also discloses the use of this new form of TiOPc in a layered electrophotographic device having high photosensitivity at exposure radiation of 780 nanometers. Further, this new polymorph of TiOPc is also described in U.S. Pat. No. 4,898,799 and in a paper presented at the Annual Conference of Japan Hardcopy in July 1989. In this paper, this same new polymorph is referred to as Type y, and reference is also made to Types I, II, and III as A, B, and C, respectively.

Layered photoresponsive imaging members have been described in a number of U.S. Patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

The use of certain perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is, for example, disclosed in this publication N,N'-bis(3-methoxypropyl)perylene-3,4,9,10-tetracarboxyldiimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978). There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there are specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

In copending application U.S. Ser. No. 537,714, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance with low dark decay characteristics and high photosensitivity, particularly in comparison to several prior art imaging members prepared by solution coating or spray coating, reference for example U.S. Pat. No. 4,429,029 mentioned hereinbefore.

In U.S. Pat. No. 5,153,313, the disclosure of which is totally incorporated herein by reference, there is illustrated a process for the preparation of phthalocyanine composites which comprises adding a metal-free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,166,339, the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or β-type titanyl phthalocyanine as determined by X-ray powder diffraction analysis; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide, titanium tetraalkoxides such as titanium tetra-methoxide, -ethoxide, -propoxide, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120° to about 300° C.; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio- groups; and mixtures thereof.

Disclosed in U.S. Pat. No. 5,164,493 is a process for the preparation of titanyl phthalocyanine Type I which comprises the addition of titanium tetraalkoxide in a solvent to a mixture of phthalonitrile and a diiminoisoindolene, followed by heating. The disclosure of this application is totally incorporated herein by reference. Disclosed in U.S. Pat. No. 5,189,156 is a process for the preparation of titanyl phthalocyanine Type I which comprises the reaction of titanium tetraalkoxide and diiminoisoindolene in the presence of a halonaphthalene solvent; and U.S. Pat. No. 5,206,359 is a process for the preparation of titanyl phthalocyanine which comprises the treatment of titanyl phthalocyanine Type X with a halobenzene, the disclosures of which are totally incorporated herein by reference.

Illustrated in U.S. Pat. No. 5,382,493, the disclosure of which is totally incorporated herein by reference, are processes for the preparation of Type II dihydroxygermanium phthalocyanine, which comprises the reaction of phthalonitrile or diiminoisoindolene with tetrahalogermanium or tetraalkoxygermanium in a suitable solvent, treatment of the resultant dihalogermanium phthalocyanine or dialkoxygermanium phthalocyanine intermediate with concentrated sulfuric acid, and then water, and filtering and washing of the dihydroxygermanium phthalocyanine precipitate with water using care that the filtrate of the washing does not exceeds a pH of 1.0, removing the absorbed acid on the dihydroxygermanium phthalocyanine product with an organic base, such as amine, and optionally washing the pigment crystals with an aprotic organic solvent, such as an alkylene halide like methylene chloride, tetrahydrofuran, or dimethylformamide; and the preparation of Type II dihydroxygermanium phthalocyanine by polymorphic conversion from other polymorphs, such as Type I polymorph, by simply treating with concentrated sulfuric acid, followed by the same washing processes as described above. The different polymorphic forms of dihydroxygermanium phthalocyanine can be readily identified by various known analytical methods including solid state absorption spectra and X-ray powder diffraction analysis (XRPD).

Also, in U.S. Pat. No. 5,473,064, the disclosure of which is totally incorporated herein by reference, there is illustrated a process for the preparation of hydroxygallium phthalocyanine Type V, essentially free of chlorine, whereby a pigment precursor Type I chlorogallium phthalocyanine is prepared by reaction of gallium chloride in a solvent such as N-methylpyrrolidone, present in an amount of from about 10 parts to about 100 parts, and preferably about 19 parts, with 1,3-diiminoisoindolene ($DI^3$), in an amount of from about 1 part to about 10 parts, and preferably about 4 parts $DI^3$, for each part of gallium chloride that is reacted; hydrolyzing said pigment precursor chlorogallium phthalocyanine Type I by standard methods, for example acid pasting, whereby the pigment precursor is dissolved in concentrated sulfuric acid and then reprecipitated in a solvent, such as water, or a dilute ammonia solution, for example, from about 10 to about 15 percent; and subsequently treating the resulting hydrolyzed pigment hydroxygallium phthalocyanine Type I with a solvent, such as N,N-dimethylformamide, present in an amount of from about 1 volume part to about 50 volume parts and preferably about 15 volume parts, for each weight part of pigment hydroxygallium phthalocyanine that is used by, for example, ball milling said Type I hydroxygallium phthalocyanine pigment in the presence of spherical glass beads, approximately 1 millimeters to 5 millimeters in diameter, at room temperature, about 25° C., for a period of from about 12 hours to about 1 week, and preferably about 24 hours such that there is obtained a hydroxygallium phthalocyanine Type V, ball milling contains very low levels of residual chlorine of from about 0.001 percent to about 0.1 percent, and in an embodiment about 0.03 percent of the weight of the Type V hydroxygallium pigment, as determined by elemental analysis.

The disclosures of all of the aforementioned publications, laid open applications, copending applications and patents are totally incorporated herein by reference.

SUMMARY OF THE INVENTION

It is an object of the present invention to provide processes for the preparation of hydroxygallium phthalocyanine and imaging members thereof with many of the advantages illustrated herein.

Another object of the present invention relates to the provision of improved layered photoresponsive imaging members with photosensitivity to near infrared radiations.

It is yet another object of the present invention to provide simple and economical processes for the preparation of Type V hydroxygallium phthalocyanine.

In a further object of the present invention there are provided processes for the preparation of Type V hydroxygallium phthalocyanine with XRPD peaks at Bragg angles of 7.4, 9.8, 12.4, 16.2, 17.6, 18.4, 21.9, 23.9, 25.0, 28.1, and the highest peak at 7.4 degrees 2Θ.

In a further object of the present invention there are provided processes for the preparation of Type V hydroxygallium phthalocyanine by stirring Type I hydroxygallium phthalocyanine from the azeotrope solution in N,N-dimethylformamide only without ball milling to provide electrical grade (analytically pure) Type V hydroxygallium phthalocyanine.

A further object of the present invention is the provision of processes wherein the reduction of the sulfur content in the Type V obtained is from 50 to 300 ppm by stirring the wet pigment from the conversion of Type I to Type V in an organic hydrophilic solvent and aqueous concentrated ammonium hydroxide solution.

A further object of the present invention is the provision of processes wherein the reduction of the sulfur content in Type V obtained is from 50 to 300 ppm by stirring the wet pigment obtained from acid pasting in an organic hydrophilic solvent and aqueous concentrated ammonium hydroxide solution.

A further object of the present invention relates to the preparation of electrically pure Type V hydroxygallium phthalocyanine in acceptable yield, exceeding 65 percent and, for example, from about 40 percent to about 75 percent, and wherein halogens, such as chlorine, are not contained in the product which halogens adversely effect the photoconductive characteristics of imaging members with the Type V as a photogenerating pigment.

In still a further object of the present invention there are provided photoresponsive imaging members with an aryl amine hole transport layer, and a photogenerator layer comprised of Type V hydroxygallium phthalocyanine pigment components obtained by the processes illustrated herein.

The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_o$ of about −800 volts. After resting for 0.5 second in the dark, the charged members attained a surface potential of $V_{ddp}$, dark development potential. Each member was then exposed to light from a filtered Xenon lamp with a XBO 150 watt bulb, thereby inducing a photodischarge which resulted in a reduction of surface potential to a $V_{bg}$ value, background potential. The percent of photodischarge was calculated as $100\times(V_{ddp}-V_{bg})/V_{ddp}$. The desired wavelength and energy of the exposed light was determined by the type of filters placed in front of the lamp. The monochromatic light photosensitivity was determined using a narrow band-pass filter. The photosensitivity of the imaging members is usually provided in terms of the amount of exposure energy in ergs/$cm^2$, designated as $E_{1/2}$, required to achieve 50 percent photodischarge from the dark development potential. The higher the photosensitivity, the smaller is the $E_{1/2}$ value.

These and other objects of the present invention can be accomplished in embodiments thereof by the provision of processes for the preparation of hydroxygallium phthalocyanine, especially Type V hydroxygallium, and photoresponsive imaging members thereof. More specifically, in embodiments of the present invention there are provided processes for the preparation of Type V hydroxygallium phthalocyanine, which comprises preparing a precursor gallium phthalocyanine, prepared by the reaction of 1,3-diiminoisoindolene in a suitable solvent, such as quinoline, halo, and especially chloronaphthalene, or N-methylpyrrolidone, and the like; hydrolyzing the precursor by dissolving in a strong acid and then reprecipitating the dissolved pigment in, for example, aqueous ammonia, thereby forming Type I hydroxygallium phthalocyanine; and admixing the Type I. Thereafter, the formed Type I can either be washed to reduce contaminants like sulfur or dried azeotropically with a hydrophobic solvent such as hexanes, toluene, butylacetate and the like; followed by treating the Type I either by ball milling or by stirring in DMF, preferably the latter, with a hydrophobic solvent, such as hexane, and heating to azeotropically remove water. The hydroxygallium phthalocyanine Type I can then be ball milled with DMF or stirred in DMF to afford Type V hydroxygallium phthalocyanine, and wherein there are enabled photoconductive imaging members with excellent electrical characteristics. Also, in embodiments the obtained hydroxygallium phthalocyanine Type V can be washed as illustrated herein to eliminate, or reduce the amount of sulfur contained therein.

Embodiments of the present invention are directed to processes for the preparation of hydroxygallium phthalocyanine Type V, which comprise the reaction of 1 part gallium acetylacetonate with from about 1 part to about 10 parts and preferably about 4 parts of 1,3-diiminoisoindolene in a solvent, such as quinoline, chloronaphthalene, or N-methyl pyrrolidone, in an amount of from about 10 parts to about 100 parts and preferably about 19 parts, for each part of gallium acetylacetonate that is used to provide a pigment precursor gallium phthalocyanine, which is subsequently washed with a component, such as dimethylformamide, to provide a pure form of the precursor gallium phthalocyanine as determined by X-ray powder diffraction; dissolving 1 weight part of the resulting gallium phthalocyanine in concentrated, about 94 percent, sulfuric acid, in an amount of from about 1 weight part to about 100 weight parts and in an embodiment about 5 weight parts, by stirring said pigment in said acid for an effective period of time, from about 30 seconds to about 24 hours, and in an embodiment about 2 hours at a temperature of from about 0° C. to about 75° C., and preferably about 40° C., in air or under an inert atmosphere such as argon or nitrogen; adding the resulting mixture to a stirred organic solvent in a dropwise manner at a rate of about 0.5 milliliter per minute to about 10 milliliters per minute, and in an embodiment about 1 milliliter per minute to a nonsolvent, which can be a mixture comprised of from about 1 volume part to about 10 volume parts, and preferably about 4 volume parts of concentrated aqueous ammonia solution (14.8N) and from about 1 volume part to about 10 volume parts, and preferably about 7 volume parts of water, for each volume part of sulfuric acid that was used, which solvent mixture was chilled to a temperature of from about −25° C. to about 10° C., and in an embodiment about −5° C. while being stirred at a rate sufficient to create a vortex extending to the bottom of the flask containing said solvent mixture; isolating the resulting blue pigment by, for example, filtration; and washing the hydroxygallium phthalocyanine product obtained with deionized water by redispersing and filtering from portions of deionized water, which portions are from about 10 volume parts to about 400 volume parts, and in an embodiment about 200 volume parts for each weight part of precursor pigment gallium phthalocyanine which was used. The product, a dark blue solid, was confirmed to be Type I hydroxygallium phthalocyanine on the basis of its X-ray diffraction pattern, having major peaks at 6.9, 13.1, 16.4, 21.0, 26.4, and the highest peak at 6.9 degrees 2Θ. The Type I hydroxygallium phthalocyanine product obtained can then be treated with a polar aprotic solvent, such as N,N-dimethylformamide, or N-methylpyrrolidone, or the like, by, for example, ball milling said Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours, such that there is obtained a hydroxygallium phthalocyanine. Also, in embodiments the obtained hydroxygallium phthalocyanine Type V can be washed as illustrated herein to eliminate, or reduce the amount of sulfur contained therein.

Also, in embodiments the process of the present invention comprises hydrolyzing a gallium phthalocyanine precursor pigment by dissolving said hydroxygallium phthalocyanine in a strong acid and then reprecipitating the resulting dissolved pigment in basic aqueous media; removing any ionic species formed by washing with water, concentrating the resulting aqueous slurry comprised of water and hydroxygallium phthalocyanine to a wet cake; removing water from said slurry by azeotropic distillation with an organic solvent; and subjecting said resulting pigment slurry to mixing with the addition of a second solvent to cause the formation of said hydroxygallium phthalocyanine polymorphs.

For the preparation of the precursor gallium phthalocyanine, the process in embodiments comprises the reaction of 1 part gallium acetylacetonate with from about 1 part to about 10 parts, and preferably about 4 parts of $DI^3$ (1,3-diiminoisoindolene) in the presence of N-methyl pyrrolidone solvent in an amount of from about 10 parts to about 100 parts and preferably about 19 parts, whereby there is obtained a crude gallium phthalocyanine, which is subsequently purified up to about a 99.5 percent purity by washing with, for example, hot dimethylformamide, at a temperature of from about 70° C. to about 150° C., and preferably about 150° C., in an amount of from about 1 to about 10, and preferably about 3 times the volume of the solid being washed.

In embodiments, the process of the present invention comprises 1) the addition of 1 part gallium acetylacetonate to a stirred solvent quinoline present in an amount of from about 10 parts to about 100 parts, and preferably about 19 parts with from about 1 part to about 10 parts, and preferably about 4 parts of 1,3-diiminoisoindolene; 2) relatively slow application of heat using an appropriate sized heating mantle at a rate of about 1 degree per minute to about 10 degrees per minute, and preferably about 5 degrees per minute until refluxing occurs at a temperature of about 200° C.; 3) continued stirring at said reflux temperature for a period of about ½ hour to about 8 hours and preferably about 4 hours; 4) cooling of the reactants to a temperature of about 130° C. to about 180° C., and preferably about 160° C. by removal of the heat source; 5) filtration of the flask contents through, for example, an M-porosity (10 to 15 μm) sintered glass funnel which was preheated using a solvent, which is capable of raising the temperature of said funnel to about 150° C., for example, boiling N,N-dimethylformamide in an amount sufficient to completely cover the bottom of the filter funnel so as to prevent blockage of said funnel; 6) washing the resulting purple solid by slurrying said solid in portions of boiling DMF either in the funnel or in a separate vessel in a ratio of about 1 to about 10, and preferably about 3 times the volume of the solid being washed until the hot filtrate became light blue in color; 7) cooling and further washing the solid of impurities by slurrying the solid in portions of N,N-dimethylformamide at room temperature, about 25° C., approximately equivalent to about three times the volume of the solid being washed until the filtrate became light blue in color; 8) washing the solid of impurities by slurrying said solid in portions of an organic solvent, such as methanol, acetone, water and the like, and in an embodiment methanol at room temperature, about 25° C., approximately equivalent to about three times the volume of the solid being washed, until the filtrate became light blue in color; 9) oven drying the purple solid in the presence of a vacuum or in air at a temperature of from about 25° C. to about 200° C. and preferably about 70° C. for a period of from about 2 hours to about 48 hours and preferably about 24 hours thereby resulting in the isolation of a shiny purple solid which was identified as being Type I chlorogallium phthalocyanine by its had an X-ray powder diffraction trace, having major peaks at 7.6, 8.1, 9.7, 16.0, 18.4, 19.2, 19.9, 24.7, 25.7, and 26.2, and the highest peak at 8.1 degrees 2Θ. Thereafter, the obtained hydroxygallium phthalocyanine Type V can have the water azeotropically removed therefrom. Also in embodiments the obtained hydroxygallium phthalocyanine Type V can be washed as illustrated herein to eliminate, or reduce the amount of sulfur contained therein.

Numerous different layered photoresponsive imaging members with the Type V hydroxygallium phthalocyanine pigment obtained by the processes of the present invention can be fabricated. In embodiments, thus the layered photoresponsive imaging members are comprised of a supporting substrate, a charge transport layer, especially an aryl amine hole transport layer, and situated therebetween a photogenerator layer comprised of the Type V hydroxygallium phthalocyanine photogenerating pigment. Another embodiment of the present invention is directed to positively charged layered photoresponsive imaging members comprised of a supporting substrate, a charge transport layer, especially an aryl amine hole transport layer, and as a top overcoating layer Type V hydroxygallium phthalocyanine pigment obtained with the processes of the present invention. Moreover, there is provided in accordance with the present invention an improved negatively charged photoresponsive imaging member comprised of a supporting substrate, a thin adhesive layer, Type V hydroxygallium phthalocyanine photogenerator obtained by the processes of the present invention dispersed in a polymeric resinous binder, such as poly(vinyl butyral), and as a top layer aryl amine hole transporting molecules dispersed in a polymeric resinous binder such as polycarbonate.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members of the present invention are useful in various electrostatographic imaging and printing systems, particularly those conventionally known as xerographic processes. Specifically, the imaging members of the present invention are useful in xerographic imaging processes wherein the Type V hydroxygallium phthalocyanine pigment absorbs light of a wavelength of from about 650 to about 900 nanometers, and preferably from about 700 to about 800 nanometers. In these known processes, electrostatic latent images are initially formed on the imaging member followed by development, and thereafter transferring the image to a suitable substrate. Imaging members employing Type V hydroxygallium phthalocyanine photogenerator pigment of the present invention exhibit high photosensitivities, generally with $E_{1/2}$ of about 2.0 ergs/cm$^2$ or less, even when exposed to monochromatic radiation of about 700 to 800 nanometers.

Moreover, the imaging members of the present invention can be selected for electronic printing processes with gallium arsenide light emitting diode (LED) arrays which typically function at wavelengths of from 660 to about 830 nanometers.

One negatively charged photoresponsive imaging member of the present invention is comprised, in the order indicated, of a supporting substrate, an adhesive layer comprised, for example, of a polyester 49,000 available from Goodyear Chemical, a photogenerator layer comprised of Type V hydroxygallium phthalocyanine obtained with the process of the present invention, optionally dispersed in an inactive polymer binder, and a hole transport layer thereover comprised of N,N'-diphenyl-N,N'-bis(3-methyl phenyl)-1, 1'-biphenyl-4,4'-diamine dispersed in a polycarbonate binder, and a positively charged photoresponsive imaging member comprised of a substrate, thereover a charge transport layer comprised of N,N'-diphenyl-N,N'-bis(3-methyl phenyl)- 1,1'-biphenyl-4,4'-diamine dispersed in a polycarbonate binder, and a top photogenerator layer comprised of Type V hydroxygallium phthalocyanine obtained with the process of the present invention optionally dispersed in an inactive polymer binder.

Examples of substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt, and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is comprised of Type V hydroxygallium phthalocyanine obtained with the processes of the present invention dispersed in polymer binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the dihydroxygermanium phthalocyanine photogenerator composition is present in an amount of from about 5 percent to about 100 percent by volume. In one embodiment, this layer is of a thickness of from about 0.25 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The photogenerator layer can be fabricated by coating a dispersion of Type V hydroxygallium phthalocyanine obtained with the processes of the present invention in a suitable solvent with or without an optional polymer binder material. The dispersion can be prepared by mixing and/or milling the Type V in equipment such as paint shakers, ball mills, sand mills and attritors. Common grinding media such as glass beads, steel balls or ceramic beads may be used in this equipment. The binder resin may be selected from a number of known polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. In embodiments of the present invention, it is desirable to select a coating solvent that does not disturb or adversely affect the other previously coated layers of the device. Examples of solvents that can be selected for use as coating solvents for the photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the photogenerator layer in embodiments of the present invention can be accomplished with spray, dip or wire-bar methods such that the final dry thickness of the photogenerator layer is from 0.01 to 30 microns and preferably from 0.1 to 15 microns after being dried at 40° to 150° C. for 5 to 90 minutes.

Illustrative examples of polymeric binder materials that can be selected for the photogenerator pigment include those polymers as disclosed in U.S. Pat. No. 3,121,006, the disclosure of which is totally incorporated herein by reference.

As adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of from about 0.001 micron to about 1 micron. Optionally, this layer may contain conductive and nonconductive particles, such as zinc oxide, titanium dioxide, silicon nitride, carbon black, and the like, to provide, for example, in embodiments of the present invention desirable electrical and optical properties.

Aryl amines selected for the hole transporting layer, which generally is of a thickness of from about 5 microns to about 75 microns, and preferably of a thickness of from about 10 microns to about 40 microns, include molecules of the following formula

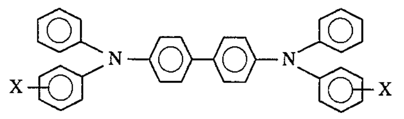

dispersed in a highly insulating and transparent polymer binder, wherein X is an alkyl group or a halogen, especially those substituents selected from the group consisting of Cl and $CH_3$.

Examples of specific aryl amines are N,N'-diphenyl-N,N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)-1,1'-biphenyl-4,4'-diamine wherein the halo substituent is preferably a chloro substituent. Other known charge transport layer molecules can be selected, reference for example U.S. Pat. Nos. 4,921,773 and 4,464,450, the disclosures of which are totally incorporated herein by reference.

Examples of the highly insulating and transparent polymer binder material for the transport layers include materials such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The following Examples are being submitted to illustrate embodiments of the present invention. These Examples are intended to be illustrative only and are not intended to limit the scope of the present invention. Also, parts and percentages are by weight unless otherwise indicated. A comparative Example is also provided.

EXAMPLE I

Alkoxy-bridged Gallium Phthalocyanine Dimer Synthesis Using Gallium Methoxide Obtained From Gallium Chloride and Sodium Methoxide In Situ To a 1 liter round bottomed flask were added 25 grams of $GaCl^3$ and 300 milliliters of toluene, and the mixture was stirred for 10 minutes to form a solution. Then, 98 milliliters of a 25 weight percent sodium methoxide solution (in methanol) were added while cooling the flask with an ice bath to keep the contents below 40° C. Subsequently, 250 milliliters of ethylene glycol and 72.8 grams of o-phthalodinitrile were added. The methanol and toluene were quickly distilled off over 30 minutes while heating from 70° to 135° C., and then the phthalocyanine synthesis was performed by heating at 195° C. for 4.5 hours. The alkoxy-bridged gallium phthalocyanine dimer was isolated by filtration at 120° C. The product was then washed with 400 milliliters DMF at 100° C. for 1 hour and filtered. The product was then washed with 600 milliliters of deionized water at 60° C. for 1 hour and filtered. The product was then washed with 600 milliliters of methanol at 25° C. for 1 hour and filtered. The product was dried at 60° C. under vacuum for 18 hours. The alkoxy-bridged gallium phthalocyanine dimer, 1,2-di(oxogallium phthalocyaninyl) ethane, was isolated as a dark blue solid in 77 percent yield. The dimer product was characterized by elemental analysis, infrared spectroscopy, $^1$H NMR spectroscopy and X-ray powder diffraction. Elemental analysis showed the presence of only 0.10 percent chlorine. Infrared spectroscopy: major peaks at 573, 611, 636, 731, 756, 775, 874, 897, 962, 999, 1069, 1088, 1125, 1165, 1289, 1337, 1424, 1466, 1503, 1611, 2569, 2607, 2648, 2864, 2950, and 3045 $cm^{-1}$; $^1$H NMR spectroscopy (TFA-d/$CDCl_3$ solution, 1:1 v/v, tetramethylsilane reference): peaks at (δ, ppm±0.01 ppm) 4.00 (4H), 8.54 (16H), and 9.62 (16H); X-ray powder diffraction pattern: peaks at Bragg angles (2Θ±0.2°) of 6.7, 8.9, 12.8, 13.9, 15.7, 16.6, 21.2, 25.3, 25.9, and 28.3 with the highest peak at 6.7 degrees 2Θ.

EXAMPLE II

Hydrolysis of Alkoxy-bridged Gallium Phthalocyanine to Hydroxygallium Phthalocyanine. (Type I)

The hydrolysis of alkoxy-bridged gallium phthalocyanine synthesized in Example I above to hydroxygallium phthalocyanine was performed as follows. Sulfuric acid (94 to 96 percent, 125 grams) was heated to 40° C. in a 125 milliliter Erlenmeyer flask, and then 5 grams of the chlorogallium phthalocyanine were added. Addition of the solid was completed in approximately 15 minutes, during which time the temperature of the solution increased to about 48° C. The acid solution was then stirred for 2 hours at 40° C., after which it was added in a dropwise fashion to a mixture comprised of concentrated (~30 percent) ammonium hydroxide (265 milliliters) and deionized water (435 milliliters), which had been cooled to a temperature below 5° C. The addition of the dissolved phthalocyanine was completed in approximately 30 minutes, during which time the temperature of the solution increased to about 40° C. The reprecipitated phthalocyanine was then removed from the cooling bath and allowed to stir at room temperature for 1 hour. The resulting phthalocyanine was then filtered through a porcelain funnel fitted with a Whatman 934-AH grade glass fiber filter. The resulting blue solid was redispersed in fresh deionized water by stirring at room temperature for 1 hour and filtered as before. This process was repeated at least three times, until the conductivity of the filtrate was <20 μS. The filtercake was oven dried overnight at 50° C. to give 4.75 grams (95 percent) of Type I HOGaPc, identified by infrared spectroscopy and X-ray powder diffraction. Infrared spectroscopy: major peaks at 507, 573, 629, 729, 756, 772, 874, 898, 956, 984, 1092, 1121, 1165, 1188, 1290, 1339, 1424, 1468, 1503, 1588, 1611, 1757, 1835, 1951, 2099, 2207, 2280, 2384, 2425, 2570, 2608, 2652, 2780, 2819, 2853, 2907, 2951, 3049 and 3479 (broad) $cm^{-1}$; X-ray diffraction pattern: peaks at Bragg angles of 6.8, 13.0, 16.5, 21.0, 26.3 and 29.5 with the highest peak at 6.8 degrees 2Θ (2 theta +/− 0.2°).

EXAMPLE III

Conversion of Type I Hydroxygallium Phthalocyanine to Type V

The Type I hydroxygallium phthalocyanine pigment obtained in Example IT above, was converted to Type V HOGaPc as follows. The Type I hydroxygallium phthalocyanine pigment (3.0 grams) was added to 25 milliliters of N,N-dimethylformamide in a 60 milliliter glass bottle containing 60 grams of glass beads (0.25 inch in diameter). The bottle was sealed and placed on a ball mill overnight ( 18 hours). The solid was isolated by filtration through a porcelain funnel fitted with a Whatman GF/F grade glass fiber filter, and washed in the filter using several 25 milliliter portions of acetone. The filtered wet cake was oven dried overnight at 50° C. to provide 2.8 grams of Type V HOGaPc which was identified by infrared spectroscopy and X-ray powder diffraction. Infrared spectroscopy: major peaks at 507, 571, 631, 733, 756, 773, 897, 965, 1067, 1084, 1121, 1146, 1165, 1291, 1337, 1425, 1468, 1503, 1588, 1609, 1757, 1848, 1925, 2099, 2205, 2276, 2384, 2425, 2572, 2613, 2653, 2780, 2861, 2909, 2956, 3057 and 3499 (broad) $cm^{-1}$; X-ray diffraction pattern: peaks at Bragg angles of 7.4, 9.8, 12.4, 12.9, 16.2, 18.4, 21.9, 23.9, 25.0 and 28.1 with the highest peak at 7.4 degrees 2Θ (2 theta +/−0.2°).

EXAMPLE IV

Azeotropic Removal of Water and Conversion of Type I Hydroxygallium Phthalocyanine to Type V Hydroxygallium Phthalocyanine The wet cake of Example III, 100 grams, whose filtrate had a conductivity of from 5 to 20 $\mu S/cm^2$, was added to a 1,000 milliliter round bottom flask equipped with a magnetic stirrer, a dean stark apparatus, a gas inlet tube and a thermometer. To this was added hexane (200 milliliters) and then the mixture was heated with a heating mantle. The water was collected in a dean stark apparatus, and heating continued until the reflux temperature reached that of the boiling point (69° C.) of hexane. The mixture was then filtered and the wet paste was stirred in DMF (100 grams) for 17 hours. The mixture was filtered and redispersed in acetone (100 grams) for one-half hour. The mixture was filtered and then oven dried to provide Type V hydroxygallium phthalocyanine (5.0 grams). The aforementioned product was characterized by X-ray powder diffraction and showed peaks at Bragg angles (2Θ±0.2°) of 6.7, 8.9, 12.8, 13.9, 15.7, 16.6, 21.2, 25.3, 25.9, and 28.3, with the highest peak at 6.7 degrees 2Θ.

EXAMPLE V

Azeotropic Removal of Water and Conversion of Type I Hydroxygallium Phthalocyanine to Type V Hydroxygallium Phthalocyanine—One Pot Process The wet cake of Example III, 100 grams, whose filtrate had a conductivity of <20 $\mu S/cm^2$, was added to a 1,000 milliliter round bottom flask equipped with a magnetic stirrer, a dean stark apparatus, a gas inlet tube and a thermometer. To this was added hexane (200 milliliters) and then the mixture was heated with an heating mantle. The water was collected in the dean stark apparatus, and heating continued until the reflux temperature reached that of the boiling point of hexane. To the mixture was added DMF (200 grams) and the 2 phase system was stirred for 24 hours. The mixture was filtered and redispersed in acetone (100 grams) for one-half hour. The mixture was filtered and then oven dried to give Type V hydroxygallium phthalocyanine (5.0 grams). The product was characterized by X-ray powder diffraction and showed peaks at Bragg angles($2\Theta \pm 0.2°$) of 6.7, 8.9, 12.8, 13.9, 15.7, 16.6, 21.2, 25.3, 25.9, and 28.3 with the highest peak at 6.7 degrees $2\Theta$.

EXAMPLE VI (BK26297-12Bi-CK1088)

Sulfur Reduction of Type V Hydroxygallium Phthalocyanine with DMF as the Wash Solvent Type V hydroxygallium phthalocyanine as a wet paste (2.5 grams of Type V pigment and 25 grams of water) was dispersed in a DMF/3.7N ammonium hydroxide solution (250 milliliters, 4:1 ratio) and stirred for 2 hours. The resulting mixture was filtered with a Buchner funnel under vacuum using GF/F filter paper and the DMF/DIW wash was repeated. The resulting mixture was than filtered with a Buchner funnel under vacuum using GF/F filter paper and suspended in water, stirred for one half hour, and filtered. This water wash is continued until the conductivity of the filtrate is between 5 and 20 $\mu S/cm^2$. The wet paste is then dried in vacuo (24 hours, 60° C.) to afford electrical grade (>99 percent by elemental analysis) Type V hydroxygallium phthalocyanine with a sulfur content of 185 ppm.

EXAMPLE VII

Sulfur Reduction of Type V Hydroxygallium Phthalocyanine with NMP as the Wash Solvent Type V hydroxygallium phthalocyanine (Example V) as a wet paste (2.5 grams of pigment and 25 grams of water) is dispersed in an NMP/3.7N ammonium hydroxide solution (250 milliliters, 4:1 ratio) and stirred for 2 hours. The mixture is filtered and the NMP/3.7N ammonium hydroxide solution wash is repeated. The mixture is filtered and suspended in water, stirred for one-half hour, and filtered. This water wash is continued until the conductivity of the filtrate is between 5 and 20 $\mu S/cm^2$. The wet paste is then dried in vacuo (24 hours, 60° C.) to afford electrical grade (>99 percent by elemental analysis) Type V hydroxygallium phthalocyanine with a sulfur content of 191 ppm.

EXAMPLE VIII

Sulfur Reduction with Water Wash Only

Hydroxygallium phthalocyanine Type V (3 grams as per Example V) was suspended in water (300 milliliters) and stirred for 2 hours, and then filtered with a Buchner funnel under vacuum using GF/F filter paper. This process was repeated 3 times. The sulfur content (as measured using a LECO SC 132 sulfur determinator, where the sulfur is burned in a furnace and detected by an infrared cell) of the Type V hydroxygallium phthalocyanine was 839 ppm.

EXAMPLE IX

Sulfur Reduction on Type I Hydroxygallium Phthalocyanine, Followed by Conversion to Type V Hydroxygallium Phthalocyanine The wet cake (2.5 grams of pigment and 25 grams of water) of Type I hydroxygallium phthalocyanine of Example IV was added to a DMF/3.7N ammonium hydroxide solution/400 milliliters, 3:1 ratio), and stirred for 2 hours, then filtered. This was repeated once, and then the wet cake washed repeatedly with water until the filtrate conductivity was below 20 $\mu S/cm^2$. The solid was dried and converted to Type V hydroxygallium phthalocyanine (as per Example V). The sulfur content of Type V hydroxygallium phthalocyanine was 166 ppm.

EXAMPLE X

The hydroxygallium phthalocyanines can be selected as photogenerating layers for layered photoconductive imaging members, including Devices 1 and 2 of Table 4, prepared by the following procedure. An aluminized MYLAR® substrate, about 4 mil in thickness, was coated with a silane/zirconium alkoxide solution, prepared by mixing 6.5 grams of acetylacetonate tributoxy zirconium (ZC540), 0.75 gram of (aminopropyl)trimethoxysilane (A1110), 28.5 grams of isopropyl alcohol, and 14.25 grams of butanol using a number 5 wire wound rod applicator. This layer was dried at 140° C. for 20 minutes; the final thickness was measured to be 0.1 micron. A dispersion of hydroxygallium Type V phthalocyanine (HOGaPc) Type V was prepared by combining 0.35 gram of the HOGaPc, prepared as described in Example VI and VII, from a precursor pigment which was prepared as described in Example I, and 0.26 gram of poly(vinyl butyral) in 25.21 grams of chlorobenzene in a 60 milliliter glass jar containing 70 grams of 0.8 millimeter glass beads. The dispersion was shaken on a paint shaker for 2 hours then was coated onto the silane/zirconium layer described above using a number 6 wire wound applicator. The formed photogenerating layer HOGaPc Type V was dried at 100° C. for 10 minutes to a final thickness of about 0.20 micron.

A hole transporting layer solution was prepared by dissolving 5.4 grams of N,N'-diphenyl-N,N-bis(3-methyl phenyl)-1,1'-biphenyl-4,4'-diamine, and 8.1 grams of polycarbonate in 61.5 grams of chlorobenzene. The solution was coated onto the HOGaPc Type V generator layer using a 10 mil film applicator. The charge transporting layer thus obtained was dried at 115° C. for 60 minutes to provide a final thickness of about 28 microns.

In a cycling test, the devices or imaging members with the photogenerating pigments of Examples V, VIII and IX were charged with a corotron to about −800 volts. They were exposed with 775 nanometers of light with an intensity of about 7 $ergs/cm^2$ and erased with white light of about 60 $ergs/cm^2$. The dark development ($V_{ddp}$) and background ($V_{bg}$) potentials were measured and recorded, while the testing was performed for 10,000 cycles. The devices were mounted on a drum housed in a controlled environmental chamber. During the cycling tests, the chamber is operated at 20° C., 40 percent RH. Changes in the dark development potential $\Delta V_{ddp}$ and background potential $\Delta V_{ddp}$ are determined after the cycling test. After the cycling test had been completed, the devices were remained in the darkened drum scanner for about 20 hours. After charging the device to about −800 volts with a corotron, they were exposed with 775 nanometers light with an intensity of 3 $ergs/cm^2$ and erased with white light of about 200 $ergs/cm^2$. The dark development and background potentials were measured, and recorded while the testing was performed for 5,000 cycles. The significantly higher erase light intensity, used in this second test compared to the standard test, accelerates the cycle-down (decrease in the dark development potential) in the photogenerator material, and is thus considered a stress test.

The xerographic electrical properties (Table 2) of photoresponsive imaging members prepared as described above were determined by electrostatically charging the surface thereof with a corona discharge source until the surface potential, as measured by a capacitatively coupled probe attached to an electrometer, attained an initial dark value, $V_0$, of −800 volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100\times(V_{ddp}-V_{bg})/V_{ddp}$. The half exposure energy, that is $E_{1/2}$, is the amount of exposure energy causing reduction of the $V_{ddp}$ to half of its initial value, was determined. The wavelength of light selected was 780 nanometers.

In Tables 1 and 2 that follows, there are presented information and data for layered imaging members identified as Device numbers 1 through 7, which members are comprised of the components illustrated in the Examples V to IX and Examples I and II, respectively.

Example V, Device 1, (Table 1) illustrates the results obtained with Type V hydroxygallium phthalocyanine. Example VII, Device 2, (Table 1) illustrates that a process improvement (water removal from Type I hydroxygallium phthalocyanine by azeotrope) and process simplification (elimination of ball milling) retained the original excellent P/R properties of Type V hydroxygallium phthalocyanine. Example IX, Device 9, (Table 1) illustrates that sulfur reduction can be achieved (below 200 ppm), while maintaining the original excellent P/R properties of Type V hydroxygallium phthalocyanine, and furthermore an improvement of 5 to 20 volts in cycling stability over devices fabricated with high sulfur content.

TABLE 1

XEROGRAPHIC ELECTRICAL EVALUATIONS

| Device | Example | 10K Cycling Test | | 5K Cycling Stress Test | |
|---|---|---|---|---|---|
| No. | No. | $\Delta V_{ddp}$ | $\Delta V_{bkg}$ | $\Delta V_{ddp}$ | $\Delta V_{bkg}$ |
| 1 | V | −46 | 3 | −58 | 30 |
| 2 | VII | −37 | 2 | −45 | 23 |
| 3 | IX | −31 | 2 | −40 | 22 |

TABLE 2

| EXAMPLE NO. | Device No. | DARK DECAY (V/s) | S (V · $cm^2$/erg) | $E_{1/2}$ (ergs/ $cm^2$) | Corotron Voltage (kV) | $V_{ddp}$ (volts) |
|---|---|---|---|---|---|---|
| V | 1 | 5.0 | 290 | 1.49 | −5.45 | 807 |
| VI | 2 | 6.2 | 283 | 1.56 | −5.43 | 807 |
| VII | 3 | 93.7 | 201 | 1.36 | −6.0 | 566 |
| VIII | 4 | 11.2 | 285 | 1.5 | −5.48 | 809 |
| IX | 5 | 7.4 | 298 | 1.45 | −5.45 | 809 |
| Comparative Example VIII | 6 | 96 | 200 | 1.52 | −6.0 | 641 |
| Comparative Example IX | 7 | 24.7 | 200 | 2.24 | −5.52 | 820 |

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of hydroxygallium phthalocyanines consisting essentially of hydrolyzing a gallium phthalocyanine precursor pigment by dissolving said precursor hydroxygallium phthalocyanine in a concentrated acid and then reprecipitating the resulting dissolved pigment in basic aqueous media; optionally removing any ionic species formed by washing with water; concentrating the resulting aqueous slurry comprised of water and hydroxygallium phthalocyanine to a wet cake; removing water from said slurry by azeotropic distillation with an organic solvent, and subjecting said resulting pigment slurry to mixing with the addition of a second solvent to cause the formation of said hydroxygallium phthalocyanine; and wherein the sulfur content in said pigment slurry is reduced from about 3,000 to about 5,000 parts per million to from about 50 to about 100 parts per million by solvent washing of the pigment slurry by dispersing in an organic solvent of N,N-dimethylformamide, acetone, N,N-dimethylpyrrolidone, tetrahydrofuran, methanol, or isopropanol; adding to the resulting dispersion concentrated ammonium hydroxide solution and stirring for from about 2 to about 16 hours; followed by further washing with deionized water until the conductivity of the filtrate decreases to below about 20 $mS/cm^2$.

2. A process in accordance with claim 1 wherein said gallium phthalocyanine precursor pigment is a halogallium phthalocyanine.

3. A process in accordance with claim 2 wherein said halogallium phthalocyanine is chlorogallium phthalocyanine, and said concentrated acid is sulfuric acid.

4. A process in accordance with claim 1 wherein the gallium phthalocyanine precursor pigment is an alkoxy-bridged gallium phthalocyanine.

5. A process in accordance with claim 1 wherein the gallium phthalocyanine precursor pigment is prepared by the reaction of o-phthalodinitrile or 1,3-diiminoisoindolene with a nonhalogenated gallium compound in a suitable solvent.

6. A process in accordance with claim 5 wherein the nonhalogenated gallium compound is gallium alkoxide, gallium acetylacetonate, or gallium acetate.

7. A process in accordance with claim 1 wherein Type V hydroxygallium phthalocyanine is formed.

8. A process in accordance with claim 1 wherein the aqueous pigment slurry is concentrated by filtration.

9. A process in accordance with claim 1 wherein the azeotropic water removal is accomplished with a hydrophobic organic solvent.

10. A process in accordance with claim 9 wherein the hydrophobic organic solvent is the hydrocarbon hexane, heptane, cyclohexane, or cyclopentane, or the esters of propylacetate, butylacetate or a ketone.

11. A process in accordance with claim 1 wherein a nonmilling mixing with the addition of a second solvent is performed to induce the formation of hydroxygallium phthalocyanine Type V.

12. A process in accordance with claim 11 wherein said second solvent is an aprotic polar solvent of N,N-dimethylformamide (DMF), N',N'-dimethylsulfoxide, pyridine or N',N'-dimethylpyrrolidinone.

13. A process in accordance with claim 12 wherein hydroxygallium phthalocyanine Type V results.

14. A process in accordance with claim 1 wherein the azeotropic water removal is accomplished by dispersing the wet cake comprised of Type I hydroxygallium phthalocyanine formed in a hydrophobic organic solvent followed by heating to reflux; removing any water formed; refluxing until the boiling point of the reaction mixture reaches that of the hydrophobic organic solvent; cooling and filtering the dispersion formed; dispersing the resulting precipitate in N,N-dimethylformamide and stirring for from about 16 to about 48 hours whereby conversion to Type V hydroxygallium phthalocyanine results.

15. A process in accordance with claim 14 wherein the water content is less than about 0.2 percent by weight.

16. A process in accordance with claim 1 wherein the washing results in the removal of from about 500 to about 3,000 parts per million of the impurity sulfur, which sulfur orginates from the acid selected, and there is formed Type V hydroxygallium phthalocyanine.

17. A process in accordance with claim 1 wherein the washing enables the amount of sulfur in the hydroxygallium phthalocyanine polymorph to be reduced to from about 3,000 to about 100 parts per million.

18. A process in accordance with claim 1 wherein the washing mixture is comprised of from about 1 part to about 10 parts of N,N-dimethylformamide, acetone, N,N-dimethlypyrrolidone, tetrahydrofuran or methanol, or isopropanol and 1 part of concentrated ammonium hydroxide solution.

19. A process for the preparation of Type V hydroxygallium phthalocyanine which comprises formation of a precursor gallium phthalocyanine prepared by heating 1 part gallium acetylacetonate with from about 1 part to about 10 parts in a solvent, present in an amount of from about 10 parts to about 100 parts per part of gallium acetylacetonate that is present; hydrolyzing said precursor by dissolving in a concentrated acid; and then reprecipitating the dissolved pigment in aqueous ammonia, thereby forming Type I hydroxygallium phthalocyanine; and admixing said Type I hydroxygallium phthalocyanine with an organic solvent.

20. A process in accordance with claim 5 wherein the o-phthalodinitrile, or 1,3-diiminoisoindolene and a nonhalogenated gallium compound of gallium alkoxide, gallium acetylacetonate, or gallium acetate is heated for a period of from about 1 minute to about 24 hours, and preferably about 4 hours.

21. A process in accordance with claim 5 wherein the solvent is comprised of quinoline, 1-chloronaphthalene, N-methylpyrrolidone or mixtures thereof.

22. A process in accordance with claim 2 wherein the washing of the precursor gallium phthalocyanine is accomplished with dimethylformamide at a temperature of from about 70° C. to about 150° C.

23. A process in accordance with claim 1 wherein the acid is sulfuric acid, methanesulfonic acid, or trifluoroacetic acid.

24. A process in accordance with claim 1 wherein the Type V hydroxygallium phthalocyanine obtained has major peaks, as measured with an X-ray diffractometer, at 7.4, 9.8, 12.4, 16.2, 17.6, 18.4, 21.9, 23.9, 25.0, 28.1, and the highest peak at 7.4 degrees 2Θ.

25. A process in accordance with claim 1 wherein reaction with said acid is accomplished at a temperature ranging from about 0° C. to about 50° C., followed by stirring for about 5 minutes to about 10 hours, followed by pouring the hydrolyzed hyrdoxygallium phthalocyanine mixture onto ice or into ice cold water with continuous stirring, filtering, and subsequently washing with deionized water.

26. A process in accordance with claim 1 wherein the hydroxygallium phthalocyanine Type V obtained is free of residual chlorine.

27. A process in accordance with claim 1 wherein the hydroxygallium Type V obtained is of small particle size of from about 0.01 μm to about 0.5 μm in average volume diameter.

28. A process in accordance with claim 1 wherein said filtration provides Type V hydroxygallium phthalocyanine with a sulfur content of from about 50 to about 200 parts per million.

29. A process in accordance with claim 18 wherein about 4 parts of 1,3-diiminoisoindolene are selected, and about 19 parts of said solvent are selected.

30. A process in accordance with claim 19 wherein the Type V hydroxygallium phthalocyanine obtained subsequent to admixing said Type I hydroxygallium phthalocyanine with an organic solvent possesses a reduced sulfur content of from about 3,000 to about 5,000 parts per million to from about 50 to about 100 parts per million by effecting a solvent washing of the hydroxygallium Type V phthalocyanine, which washing is accomplished by dispersing said phthalocyanine in an organic solvent of N,N-dimethylformamide, acetone, N,N-dimethylpyrrolidone, tetrahydrofuran, methanol, or isopropanol; adding to the resulting dispersion concentrated ammonium hydroxide solution and stirring for from about 2 to about 16 hours; followed by further washing with deionized water until the conductivity of the filtrate decreases to below about 20 $mS/cm^2$.

31. A process for the preparation of hydroxygallium phthalocyanines consisting of hydrolyzing a gallium phthalocyanine precursor pigment by dissolving said precursor hydroxygallium phthalocyanine in a concentrated acid and then reprecipitating the resulting dissolved pigment in basic aqueous media; concentrating the resulting aqueous slurry comprised of water and hydroxygallium phthalocyanine to a wet cake; removing water from said slurry by azeotropic distillation with an organic solvent; and subjecting said resulting pigment slurry to mixing with the addition of a second solvent to cause the formation of said hydroxygallium phthalocyanine; and wherein the sulfur content in said pigment slurry is reduced from about 3,000 to about 5,000 parts per million to from about 50 to about 100 parts per million by solvent washing of the pigment slurry containing Type V hydroxygallium phthalocyanine by dispersing in an organic solvent of N,N-dimethylformamide, acetone, N,N-dimethylpyrrolidone, tetrahydrofuran, methanol, or isopropanol; adding to the resulting dispersion concentrated ammonium hydroxide solution and stirring for from about 2 to about 16 hours; followed by further washing with deionized water until the conductivity of the filtrate decreases to below about 20 $mS/cm^2$.

* * * * *